(12) United States Patent
Lobinger et al.

(10) Patent No.: US 7,089,039 B2
(45) Date of Patent: Aug. 8, 2006

(54) METHOD AND DEVICE FOR FEEDBACK TRANSMISSION IN A RADIO COMMUNICATION SYSTEM

(75) Inventors: Andreas Lobinger, Miesbach (DE); Bernhard Raaf, München (DE); Alexander Seeger, Feldkirchen (DE); Ralf Wiedmann, München (DE)

(73) Assignee: Siemens Aktiengesellschaft, Munich (DE)

( * ) Notice: Subject to any disclaimer, the term of this patent is extended or adjusted under 35 U.S.C. 154(b) by 546 days.

(21) Appl. No.: 10/432,734

(22) PCT Filed: Nov. 15, 2001

(86) PCT No.: PCT/DE01/04291

§ 371 (c)(1),
(2), (4) Date: May 23, 2003

(87) PCT Pub. No.: WO02/43184

PCT Pub. Date: May 30, 2002

(65) Prior Publication Data

US 2004/0014503 A1 Jan. 22, 2004

(30) Foreign Application Priority Data

Nov. 23, 2002 (DE) .............................. 100 58 060

(51) Int. Cl.
*H04M 1/00* (2006.01)

(52) U.S. Cl. .................... 455/562.1; 455/561; 342/368

(58) Field of Classification Search ............ 455/562.1, 455/561, 562, 13.3, 575.7; 342/368, 378, 342/853
See application file for complete search history.

(56) References Cited

U.S. PATENT DOCUMENTS

| | | | | |
|---|---|---|---|---|
| 6,317,100 B1 * | 11/2001 | Elson et al. | ................. | 343/853 |
| 2002/0070892 A1 * | 6/2002 | Kikuchi | ....................... | 342/368 |
| 2003/0162566 A1 * | 8/2003 | Shapira et al. | ............... | 455/561 |

FOREIGN PATENT DOCUMENTS

| | | |
|---|---|---|
| DE | 198 03 188 | 7/1999 |
| EP | 0 999 658 | 5/2000 |
| GB | 2 313 261 | 11/1997 |

(Continued)

(Continued)

OTHER PUBLICATIONS

Raitola et al., "Transmission Diversity in Wideband CDMA", pp. 1545-1549.

(Continued)

*Primary Examiner*—Quochien B. Vuong
*Assistant Examiner*—Tan Trinh
(74) *Attorney, Agent, or Firm*—Bell, Boyd & Lloyd LLC

(57) ABSTRACT

A method is provided for beam shaping in a radio communication system having subscriber stations and a base station, and an antenna device with a number of antenna elements that emit a downlink signal weighted with a coefficient of an actual weighting vector to a subscriber station, the actual weighting vector being updated via feedback information from the subscriber station. The subscriber station estimates the direction of a control vector in an M-dimensional vector space using measurements of the downlink signals, it detects a deviation of the estimated direction from the direction of a reference control vector and transmits information representative of the deviation to the base station. The base station then adapts the weighting vector using the representative information.

25 Claims, 8 Drawing Sheets

FOREIGN PATENT DOCUMENTS

| WO | WO 98/43106 | 10/1998 |
| WO | WO 01/91323 | 11/2001 |
| WO | WO 01/91329 | 11/2001 |
| WO | WO 02/03565 | 1/2002 |
| WO | WO 02/03569 | 1/2002 |

OTHER PUBLICATIONS

Schmalenberger et al., "A Comparison of Two Different Algorithms for Multi Antenna C/I Balancing", pp. 483-490.

Paulraj et al., "Space Time Processing for Wireless Communications", pp. 49-83.

* cited by examiner (Prior art)

METHOD AND DEVICE FOR FEEDBACK TRANSMISSION IN A RADIO COMMUNICATION SYSTEM

BACKGROUND OF THE INVENTION

The present invention relates to a method for transmitting feedback information for beam-shaping in a radio communication system having a number of subscriber stations as well as a base station, whose associated antenna device has several antenna elements so that spatial resolution is possible during beam-shaping. The present invention further relates to a subscriber station suitable for use with such method.

In radio communication systems, messages, (voice, video information or other data) are transmitted by transmission channels with the aid of electromagnetic waves (a radio interface). The transmission takes place both in the downwards direction (downlink) from the base station to the subscriber station and in the upwards direction (uplink) from the subscriber station to the base station.

Signals that are transmitted using electromagnetic waves are subject to interference during their propagation in a propagation medium, mainly by disturbances. Disturbances due to noise mainly occur due to noise in the input stage of the receiver. Signal components pass through different propagation paths due to diffraction and reflection. Consequently, a signal can arrive at a receiver several times, from different directions, with different delays, attenuations and phase angles in each case. Moreover, parts of the reception signal can coherently superimpose at the receiver with changing phase relationships and lead to fast fading there.

From DE 197 12 549 A1, the use of smart antennas is known (i.e., antenna arrangements with several antenna elements), to increase the transmission capacity in the upwards direction. This enables the deliberate alignment of the antenna gain in a direction from which the uplink signal comes.

From A. J. Paulraj, C. B. Papadias, "Space-time processing for wireless communications", IEEE Signal Processing Magazine, November 1997, p. 49–83, various methods are known for the spatial separation of uplink and downlink signals.

For the downlink direction (i.e., from the base station to the subscriber station), particular difficulties occur because the beam-shaping has to be performed before the influencing of the transmitted signals through the radio channel. From R. Schmalenberger, J. J. Blanz, "A comparison of two different algorithms for multi antenna C/I balancing", Proc. $2^{nd}$ European Personal Mobile Communications Conference (EPMCC), Bonn, Germany, September 1997, p. 438–490, an algorithm for beam-shaping in the downwards direction is known, whereby a direct propagation path (line of sight link) between the base stations and the subscriber stations and an iterative calculation of beam-shaping vectors is presumed. The expensive iterative calculation must be completely repeated each time the properties of the transmission channel change.

From DE 198 03 188 A, a method is known whereby a spatial covariance matrix is determined for a connection from a base station to a subscriber station. At the base station, a characteristic vector is calculated for the covariance matrix and used for the connection as a beam-shaping vector. The transmitted signal for the connection is weighted with the beam-shaping vector, and antenna elements are applied for the radiation. Intracell interference is not included in the beam-shaping because of the use of joint detection, such as in the terminals, and any corruption of the received signals due to intercell interference is ignored.

Clearly, in an environment with multipath propagation, this method produces a propagation path with good transmission properties and concentrates the transmission power of the base station spatially on this propagation path. However, this does not mean that interference on this transmission path could not lead to fast fading of the signal and, thus, to interruptions in the transmission.

The recommendations of 3GPP ($3^{rd}$ Generation Partnership Project,) therefore provide methods whereby the subscriber station estimates a brief channel impulse response $h_m$ of the channel from the mth antenna element to the subscriber station and calculates weighting vectors $w_m$ to be used to weight the transmitted signal before radiation by the mth antenna element. Corresponding concepts are also dealt with in M. Raitola, A. Hottinen and R. Wichmann, "Transmission diversity in wideband CDMA", published in Proc. $49^{th}$ IEEE Vehicular Technology Conf. Spring (VTC '99 Spring), p. 1545–1549, Houston, Tex. 1999.

A serious problem with this method is that the vector of the weighting factors estimated by the subscriber station have to be transmitted to the base station and for this only a small bandwidth of 1 bit per slot is available, according to the recommendations of the 3GPP. The vectors therefore can be transmitted only roughly quantizised. If the channel changes quickly and the weightings have to be updated from one time slot to the other, only two different relative phase positions of the antenna elements can be set. If the channel changes more slowly and, for example, four time slots are available for transmission of the vector, 16 different values of the vector still can be represented.

The known concepts do, however, have their limits. If the number of antenna elements of the base station is greater than two, then the bandwidth required to transmit the vector increases with the number of its components; i.e., the number of antenna elements. As such, a large number of antenna elements would, on the one hand, be desirable to be able to align the transmission beam as accurately as possible but, on the other hand, because of the limited available bandwidth, the weighting vector cannot be updated as often as would be necessary to match the fast fading.

An object of the present invention is, therefore, to provide a method of feedback transmission in a radio communication system of the type described above, and a subscriber station suitable for use in such a system, that enable continuous updating of the weighting vectors used by the base station with a high degree of accuracy matching the speed of change of the weighting vectors while at the same time minimizing the utilization of the uplink bandwidth for updating the weighting vectors.

SUMMARY OF THE INVENTION

The components of such a weighting vector can be estimated at the subscriber station. The way and means of such an estimation is not an object of the present invention and therefore need not be dealt with in more detail here. To make the description easier to understand, a distinction is made in the following between control vectors and weighting vectors, with a control vector being the result of an estimation by the subscriber station and a weighting vector being a vector the components of which are used by the base station to control its antenna elements. It can be said that in the terminology of this application, a control vector becomes a weighting vector by its transmission from the subscriber station to the base station.

The present invention is thus based on the understanding that, with controlled beam-shaping, all that is required is that the direction of a control vector (i.e., the relative circumstances of its components (perhaps with complex-significance)), are correctly transmitted to the base station and that the amount of such a vector has no effect on the beam shaping by the base station and, therefore, does not need to be transmitted, or can be arbitrarily determined according to purpose. Furthermore, the components of a control vector change only slowly over time so that the amount of data to be transmitted to the base station to update the weighting vector also can be reduced in that instead of the numerical values of components, which can be large and contain a number of bits, only one piece of information representative of the change of the control vector needs to be transmitted, which results in a substantially lower number of bits.

This information can take the form of a vector of the arithmetical differences between the components of the estimated control vector and of a reference control vector. In this case, the number of bits required to transmit a difference between two components or two real or imaginary parts is less than would be required to transmit the component of the real or imaginary part, but is generally still greater than 1.

Preferably, the differential vector is so discretized that for each difference only one bit remains that merely gives the sign of this difference. Corresponding to this sign, the base station increments or decrements the relevant component of the weighting vector by a predetermined value x.

The deviation in the direction of a vector that can be achieved by adding +x or −x to each of its components depends on the amount of this vector. Therefore, it is appropriate to assign an amount to the control vector that is smaller by an amount corresponding to the speed at which the direction of the control vector deviates over time. In this way, it is possible for a fast moving subscriber station, whose control vector can change its direction very quickly, to bring about a satisfactory agreement between the actual value of a control vector estimated by the subscriber station and the value of the weighting vector used by the base station to transmit to the subscriber station, via a small number of matching steps in which +x or −x is added or removed in each case. On the other hand, if the control vector deviates only slowly, perhaps because the subscriber station is moving only slowly or is stationary, the direction of the control vector can be determined with a very high resolution and transmitted to the base station, because where there is a large amount of the control vector or of the weighting vector a matching of the direction of the weighting vector using the transmitted difference causes only a slight change in direction.

There are several ways in which the amount of the control or weighting vector can be matched to the rate of change of its direction. A first possibility is that the base station and subscriber station each determine the speed of change independent of each other, such as mathematically, and in each case stipulate the amount of the change as a function of the speed using the same rule. It is also conceivable to stipulate the amount in each case with the aid of the differences in that one of the several possible differences that leads to a desired change in direction is chosen, in each case depending on the speed of the change, that reduces or increases the amount of the control vector.

A similar sensitive control of the direction of the control vector can be achieved if, instead of matching the vector amount, the degree of matching of the weighting vector is determined by a given difference that is greater according to the speed with which the direction of the control vector changes.

The reference control vector used to estimate the change in direction of the control vector in step b could have been obtained in an earlier period of the method in step a as a control vector. A reference control vector of this kind is then suitable if the representative information transmitted to the base station contains numerical values of the differences of the individual components of an estimated control vector and reference control vector, so that with each transmission of this information the weighting vector can be brought into harmony with the estimated control vector.

It is particularly advantageous that the reference control vector is a mirror image of the weighting vector that is held at the subscriber station, with the reference control vector being matched, via the information representative of the direction change, in the same way as the weighting vector at the base station, in order in this way to maintain the agreement between both. This is particularly appropriate if only the sign of the changes of the individual components is transmitted to the base station, because then temporary deviations between the estimated control vector and the weighting vector must be considered.

If only changes in the direction of the control vector are always transmitted from the subscriber station to the base station, errors in the transmission thus lead to discrepancies between the reference control vector and the weighting vector that can impair the reception quality of the subscriber station. To counter this danger, it is preferably provided that the subscriber station performs an estimation of the weighting vector used by the base station and adapts the reference control vector, if there is a deviation between the weighting vector and the reference control vector.

A further possibility of reducing discrepancies between the weighting vector used by the base station and the reference control vector over time is to multiply the control vector and the weighting vector periodically by a forget factor. This forget factor is a real number between 0 and 1, preferably close to 1. The forget factor can be a constant by a simple configuration of the method. The result of this, of course, is that the amount of the weighting vector cannot exceed a limit value that depends on the value of this constant. An arbitrarily sensitive control of the direction of the control vector is then not possible. To avoid this disadvantage, it is preferred that the forget factor be a function of the amount of at least one control vector. Thus, the forget factor can, for example, be a function of the amount of the largest of the control vectors detected by the base station or a function of the sum of the amounts of the control vectors taken into account.

In general, the components of the control vectors and weighting vectors are complex-significant. In such a case, it is appropriate for the components of the control vectors and of the weighting vectors to use a representation consisting of an amount and phase. Even where there are large amounts of single components, this enables their phase, which may be subject to relatively fast changes, to be set by a constant fixed predetermined number of change steps to any new required value.

To initialize the method in accordance with the present invention, the base station must have starting values of the weighting vectors. For such starting values to be available quickly, it is possible to transmit the components of the control vectors estimated by the subscriber station as numerical values to the base station for use as weighting vectors. As part of the initialization, these components can be transmitted with a lower accuracy or resolution than estimated by the subscriber station. A useful compromise between the accuracy of the weighting vectors and the time required for their transmission to the base station can be achieved in this manner. If the weighting vectors change rapidly after the initialization, no essential gain in transmission quality would, in fact, have been achieved by a high-resolution transmission. If, on the other hand, the weighting vectors change only slowly, their directions can be adapted with high accuracy over the course of some periods of the method in accordance with the present invention.

An alternative possibility for initialization is to estimate the control vectors at the subscriber station and the weighting vectors at the base station independently of each other. In this case, the transmission of components of the control vectors to the base station is, of course, superfluous. The important thing with this variant is that the control vectors of the subscriber stations and the weighting vectors of the base station are correctly assigned to each other, so that a change in a control vector reported by the subscriber station leads to the corresponding change of the correct weighting vector at the base station. This can, for example, be achieved in that the subscriber station and base station each assess the transmission quality of a down-link and uplink signal for every single control or weighting vector, respectively, that corresponds to the vector in each case and sorts the vectors in the sequence of the transmission qualities. If brief deviations due to phase fluctuations are found during the assessment of the transmission quality, because of the reciprocity of the uplink and downlink transmission paths, the results obtained by the subscriber station and base station must be essentially the same in each case.

The fact that the amount of the control vectors is insignificant with regard to beam shaping also can be utilized with a beam shaping method whereby information representative of the change of a control vector is not transmitted to the base station but numerical values of components of such a control vector are transmitted instead. A method of this kind can be used not only for initialization of the method described above based on the transmission of differences, but also separately. After a control vector estimated by the subscriber station has been scaled using a predetermined rule, a component can be omitted during the transmission of the components of this control vector to the base station without this leading to loss of information. The missing component can be restored at the base station by using the scaling rule.

A scaling rule of this kind can, for example, be used to scale the control vector to the amount 1. Mathematically easier to manage is a scaling rule whereby an individual predetermined component is scaled to the value 1 and the other components of the control vector are transmitted to the base station.

Any method other than one based on the transmission of differences can lead to errors in the transmission of significant bits so that the weighting vector used by the base station sensitively deviates from the control vector predetermined by the subscriber station until it is overwritten by a new updating. To reduce this danger, it can be provided that at least the most significant bit of each component is transmitted several times. This transmission can, for example, take place three times, with which of the various received values of the most significant bit is the correct one being determined at the base station, in this case by "majority voting". Particularly preferred is, however, the transmission of the most significant bit only twice in each case. If two different values of the most significant bit are received at the base station, which of the two received values is probably the correct one and must be used in the new weighting vector can be determined in this case by a comparison with the value that the relevant component had in the weighting vector used in the preceding period of the method.

Additional features and advantages of the present invention are described in, and will be apparent from, the following Detailed Description of the Invention and the Figures.

DETAILED DESCRIPTION OF THE INVENTION

Figure 1:
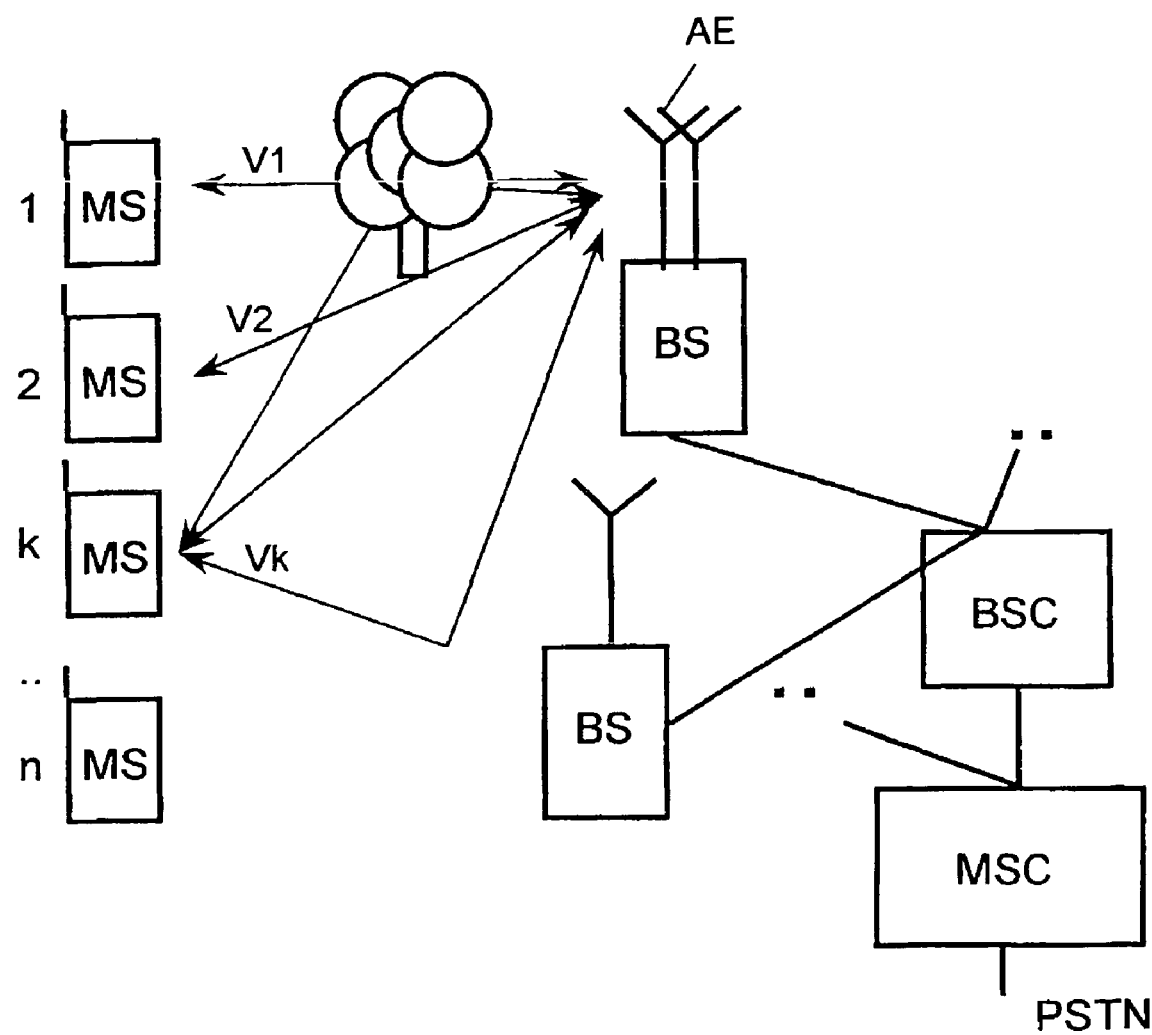
FIG. 1 shows a block diagram of a mobile radio network.

FIG. 1 shows the structure of a radio communication system with which the method in accordance with the present invention can be used. It consists of a number of mobile switching centers MSC, that are networked together or provide access to a fixed network PSTN. Furthermore, these mobile switching centers MSC are each connected to at least one base station controller BSC. Each base station controller BSC, in turn, enables a connection to at least one base station BS. Such a base station BS can establish a communication link to subscriber stations MS through a radio interface. For this purpose, at least individual base stations BS are equipped with antenna devices AE that have a number of antenna elements $(A_1$–$A_M)$.

FIG. 1 shows examples of connections V1, V2, Vk for the transmission of useful information and signaling information between subscriber stations MS1, MS2, MSk, MSn and a base station BS. The functionality of this structure can be transferred to other radio communication systems in which the present invention can be used, particularly for subscriber access networks with a wireless subscriber connection.

Figure 2:
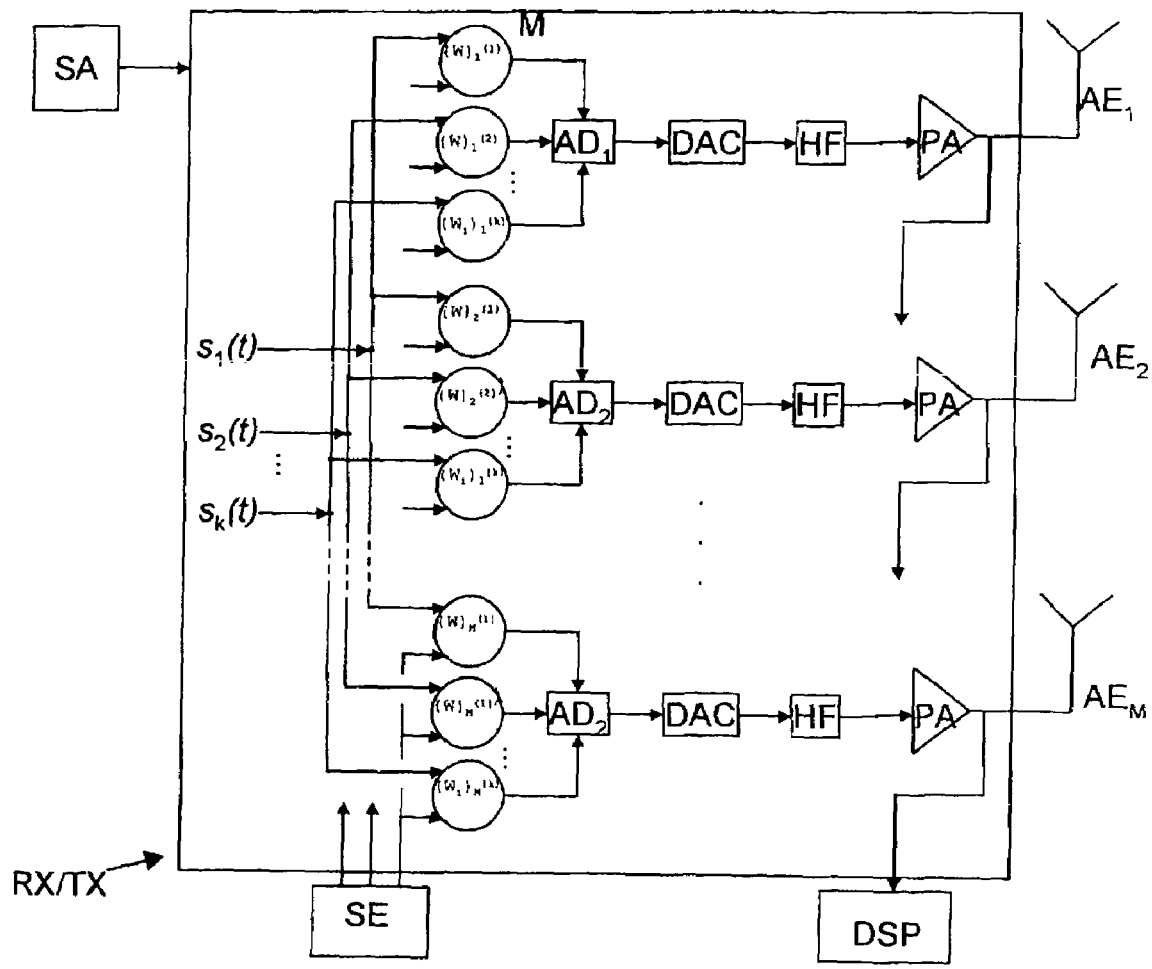
FIG. 2 shows a block diagram of the base station.

FIG. 2 is a schematic showing the structure of a base station BS. A signal generating device SA assembles the transmitted signal for the subscriber station MSk to form radio blocks and assigns it to a frequency channel TCH. A transmitting/receiving pair TX/RX receives the transmitted signal $S_k(t)$ from the signal generating device SA. The transmitting/receiving pair TX/RX includes a beam shaping network in which the transmitted signal $S_k(t)$ for the subscriber station MSk is combined with transmitted signals $s_1(t), s_2(t), \ldots$, that are meant for other subscriber stations to which the same transmitting frequency is assigned. The beam shaping network has a multiplier M for each transmitted signal and each antenna element, that multiplies the transmitted signal $S_k(t)$ with a component $(W_i)_j^{(k)}$ of a weighting vector $(W_i)^{(k)}$ that is assigned to the receiving subscriber station MSk. The output signals of the multipliers M, each of which is assigned to one of the antenna elements $AE_1, AE_2, \ldots, AE_M$, are added by an adder $AD_1, AD_2, \ldots, AD_M$, converted to analog by a digital analog converter DAC, converted to the transmitting frequency (HF) and amplified in a power amplifier PA before they reach the antenna element $AE_1, \ldots, AE_M$. A structure similar to the beam shaping network described, that is not specifically shown in the illustration, is arranged between the antenna elements $AE_1, AE_2, \ldots, AE_M$ and a digital signal processor DSP, in order to break down the received mixture of uplink signals into the contributions from the individual subscriber stations and apply these separately to the DSP.

A storage device SE contains a set of weighting vectors $(W_1)^{(k)}, (W_2)^{(k)}, \ldots, (W_m)^{(k)}$ for each subscriber station MSk, from which the weighting vector $(W_i)^{(k)}$ used by the multipliers M is selected.

Figure 3:
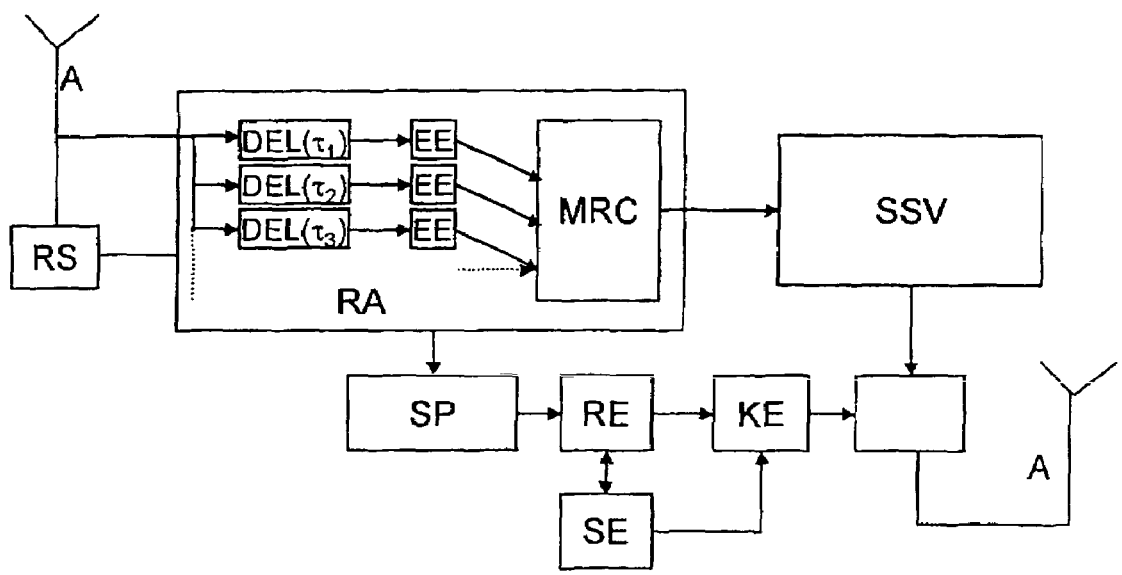
FIG. 3 shows a block diagram of the subscriber station.

FIG. 3 is a schematic showing the structure of a subscriber station MSk for implementing a first embodiment of the method in accordance with the present invention. The subscriber station MSk has a single antenna A that receives the downlink signal emitted from the base station BS. The received signal from antenna A, converted to the base band, is applied to a rake searcher RS that serves to measure the differences in the transit times of contributions of the downlink signal that have reached antenna A over different propagation paths. The received signal is also present at a rake amplifier RA that has a number of rake fingers, three of which are shown in the illustration, and each of which has a delay element DEL and a combiner-descrambler EE. The delay elements DEL delay the received signal, in each case by a delay value $\tau_1, \tau_2, \tau_3, \ldots$ provided by the rake searcher RS. The combiner-descramblers EE each supply a sequence of estimated symbols at their outputs, whereby it is possible that the results of the estimation may differ for individual descramblers because of the different phase positions of the downlink signal for the descrambling code and spread code in the individual fingers of the rake amplifier.

The symbol sequences delivered by the combiner-descramblers EE also contain the results of the estimation of training sequences emitted from the base station that are quasi-orthogonal and characteristic of each antenna element of the base station. A signal processor SP is used to compare the results of the estimation of these training sequences with the symbols actually contained in the training sequences that are known to the subscriber station. Using this comparison, the impulse response of the transmission channel between the base station BS and the subscriber station MSk can be determined for each individual finger or tap. A maximum ratio combiner MRC is also connected to the outputs of the combiner-descramblers EE, that combines the individual estimated symbol sequences to form a combined symbol sequence with the best possible signal-noise ratio, and supplies this to a voice signal processing unit SSV. The functioning of this unit SSV, that converts the received symbol sequence to an audible signal for a user or changes received tones to a sequence of transmit symbols, is sufficiently well known and need not be described here.

The signal processor SP determines, for each tap individually, the impulse responses of each antenna element $AE_1, \ldots, AE_M$ and combines these impulse responses, in the manner known, such as from the cited DE 198 03 188, to form a spatial covariance matrix $R_{XX}$. The changes to this covariance matrix $\overline{R_{XX}}$ over time reflect, on the one hand, the long-term development over time of the different transmission paths between the base station BS and the subscriber station MSk and, as well as their phase fluctuations over a short period. The processing of the spatial covariance matrices in a data processor RE of the subscriber station is detailed in the patent application of the applicant filed on 4 Jul. 2000 under official file reference 100 32 426. 6. This description is not completely repeated at this point, because not all of its details are significant for an understanding of the present invention. On the one hand, by averaging over a sequence of spatial covariance matrices $\overline{R_{XX}}$ individually received for each training sequence of the downlink signal, an average spatial covariance matrix $\overline{R_{XX}}$ is created. From this, averaged covariance matrix control vectors are determined as intrinsic vectors that must be transmitted to the base station BS in order to be used there as weighting vectors. On the other hand, short-term intrinsic values for each control vector are determined from the "short-term" spatial covariance matrices $R_{XX}$ that provide information on the contribution to the received signal that a transmission path corresponding to the particular intrinsic vector produces. After the weighting vectors have been transmitted to the base station BS, all that the subscriber station MSk still requires is to determine, using the short-term intrinsic values, that control vector or a combination of control vectors that provide it with the best reception, and to communicate information regarding the selected vectors to the base station BS so that this can then use the corresponding weighting vector or a combination of weighting vectors to send the downlink signal to the subscriber station MSk.

Because of the movement of a subscriber station, the components of the control vectors can change over time. Thus, it is necessary from time to time to adapt the weighting vectors used by the base station BS to the control vectors determined by the subscriber station. The present invention deals with the problem of how this can take place with the best possible utilization of the transmission bandwidth available for the purpose.

Figure 4:
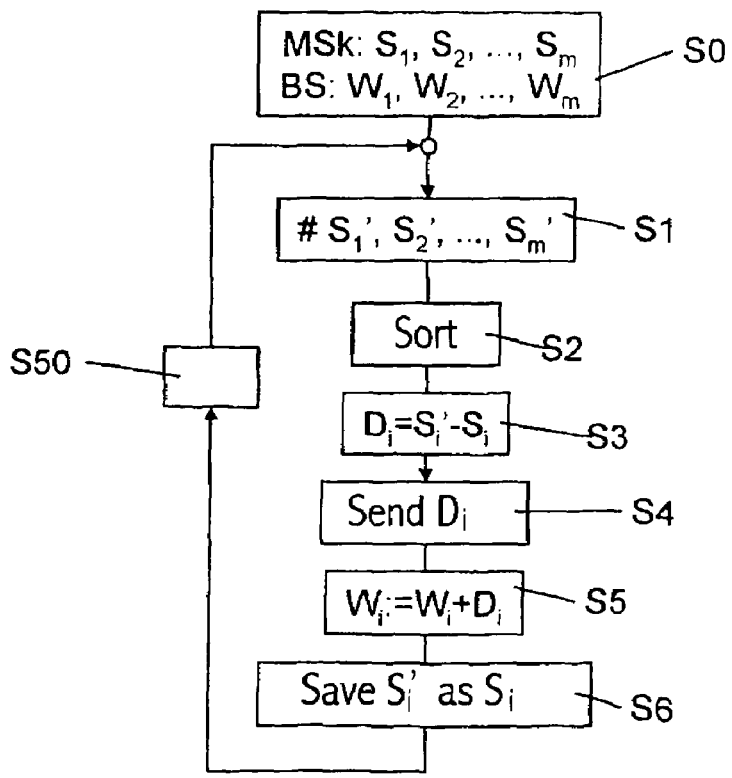
FIG. 4 shows a flow diagram of a first embodiment of the method of the present invention for updating the weighting vectors used by the base station.

FIG. 4 shows a flow diagram of a first, simple version of the method in accordance with the present invention for updating the weighting vectors $W_1, W_2, \ldots, W_m$ used by the base station BS for sending to the subscriber station MSk. The method starts from a status S0 in which the base station BS has an available set $W_1, W_2, \ldots, W_m$ of weighting vectors, and a set of reference control vectors $S_1, S_2, \ldots, S_m$ is available at the subscriber station MSk that, such as in the manner described above, have been received via an intrinsic vector analysis of the long-term covariance matrix $\overline{R_{XX}}$. In this case, it is assumed that these two sets of vectors agree with respect to the accuracy with which information can be transmitted via the measured control vectors from the subscriber station MSk to the base station BS. The question of how the base station BS receives such a set of weighting vectors $W_1, W_2, \ldots, W_m$ is to be dealt with at a later point.

The subscriber station MSk periodically performs an intrinsic vector analysis of the long-term covariance matrix $\overline{R_{XX}}$ that, for this purpose, is held at a current state; for example, by a sliding average value formation over the short-term covariance matrices $R_{XX}$. The period with which the intrinsic vector analysis can be performed can be permanently predetermined; but it also can be varying relative to the speed of change of the intrinsic vectors and be agreed between the subscriber station MSk and base station BS.

Via an intrinsic vector analysis of this kind, a set of intrinsic vectors is obtained in step S1 that are used as new control vectors $S_1', S_2', \ldots, S_m'$ and differ generally from the reference control vectors $S_1, S_2, \ldots, S_m$. To be able to estimate the extent of the changes of the new control vectors compared to the reference control vectors, it is first necessary to sort the newly received control vectors $S_1', S_2', \ldots, S_m'$ in step S2 or, more precisely, to determine which of the new control vectors has preceded which of the reference control vectors in each case. Here it is assumed that the control vectors have to be redetermined so frequently in each case that the difference in direction of a new control vector from that from which it has been produced is less in each case than from all the other control vectors. The sorting can, therefore, proceed so that the new control vectors $S_1', S_2', \ldots, S_m'$ are scaled and the one for which the expression $$\sum_i |S_i - S'_{p(i)}|^2$$

takes the smallest value is selected using all possible permutations p(i) of the m control vectors. These newly received control vectors are re-sorted corresponding to this permutation, with the result that $S_1'$ is produced from $S_1$, $S_2'$ from S2, etc.

The difference $D_i = S_i' - S_i$ is then determined for all control vectors and, in step S4, sent to the base station BS. The base station adds each received vectorial difference $D_i$ to the corresponding weighting vector $W_i$ used by it and from now on uses the weighting vectors $W_i$ updated in this way to send to the subscriber station MSk. The newly received control vectors $S_i'$ are stored in step S6 by the subscriber station MSk in order to be used in the succeeding period of the method as reference control vectors $S_i$ if steps S1 to S3 are repeated.

Because the components of the differential vectors $D_i$ must clearly be numerically smaller than those of the control vectors $S_i$ or $S'_I$ in order to guarantee the possibility of assignment in step S2, distinctly fewer bits are required for their transmission to the base station BS than if the numerical values of the components of the vectors $S_i'$ themselves have to be transmitted. Because the numerical values of the differences are, in general, lower in line with how short the period is with which steps S1 to S6 are repeated, the number of bits that must be reserved for transmission of the differences is that much smaller the shorter the period is. It is therefore possible to frequently update the weighting vectors $W_i$ used by the base station BS without the bandwidth required for this increasing in proportion to the updating frequency.

Figure 5:
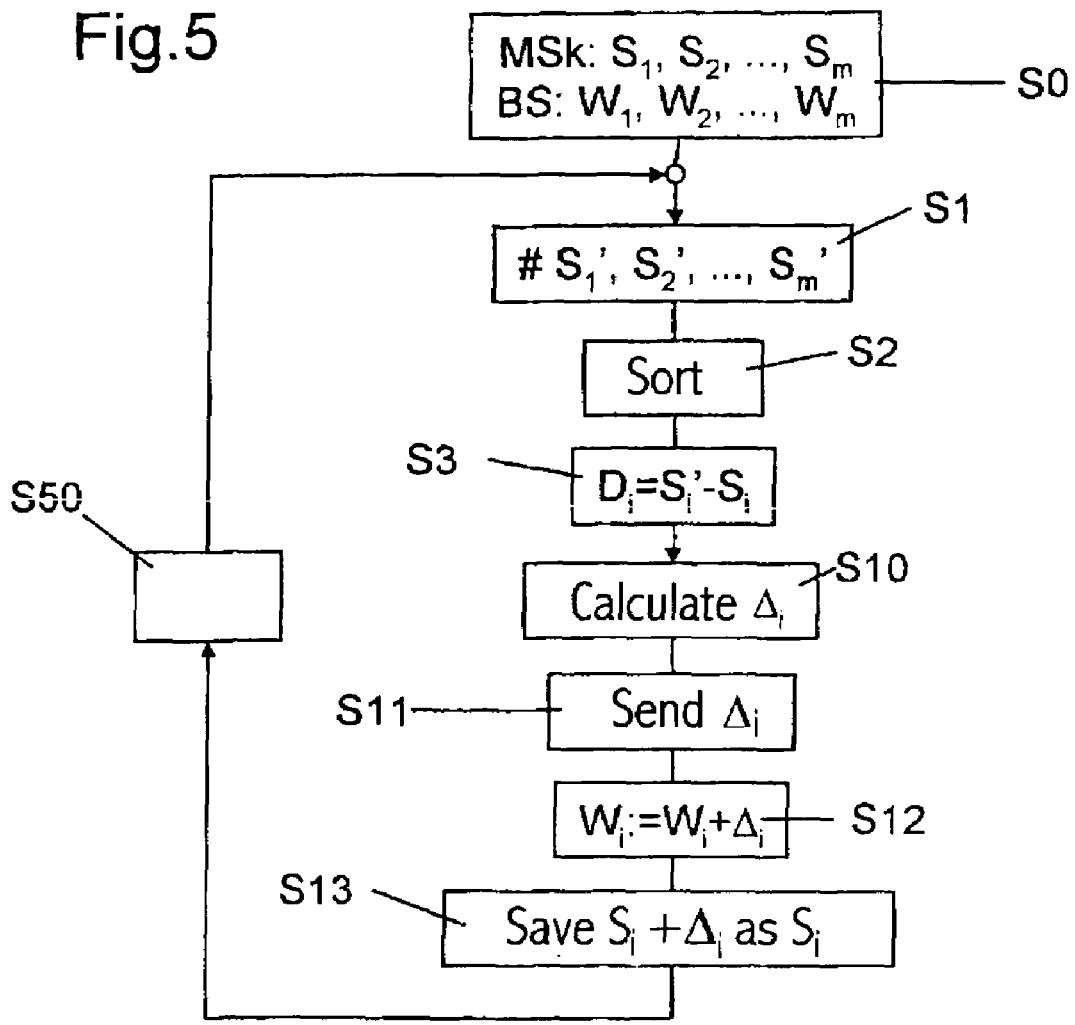
FIG. 5 shows a development of the first method from FIG. 4.

FIG. 5 shows a development of the method from FIG. 4. Steps S0 to S3 in FIG. 5 are identical with those in FIG. 4 and therefore need not be described again. An object of the method in FIG. 5 is to reduce the uplink bandwidth required for the updating of the weighting vectors even more than is possible with the method according to FIG. 4. For this purpose, a step S10 follows the step S3, in which each differential vector $D_i$ received for a pair of reference vectors and new control vectors $S_i$ or $S_i'$ is replaced by a discretized differential vector $\Delta_I$, whose components $(\Delta_i)_j$ are defined by the following formula.

$$(\Delta_i)_j = \begin{cases} +1 + i & \text{if } \operatorname{Re}(D_i)_j > 0 \text{ and } \operatorname{Im}(D_i)_j > 0 \\ +1 - i & \text{if } \operatorname{Re}(D_i)_j > 0 \text{ and } \operatorname{Im}(D_i)_j < 0 \\ -1 + i & \text{if } \operatorname{Re}(D_i)_j < 0 \text{ and } \operatorname{Im}(D_i)_j > 0 \\ -1 - i & \text{if } \operatorname{Re}(D_i)_j < 0 \text{ and } \operatorname{Im}(D_i)_j < 0 \end{cases}$$

The roughly discretized differential vector $\Delta_i$ obtained in this way is transmitted in step S11 to the base station BS and there used in step S12, in a manner similar to that described above for step S5, to update the weighting vectors $W_i$.

In this way, the bandwidth required for updating is reduced to a minimum size; i.e., one bit each for the imaginary part and real part of each component of the differential vector. The result of discretizing is that a precise agreement (in the context of the measuring accuracy of the subscriber station MSk) between the control vectors and the weighting vectors can no longer be produced. This is, however, no longer detrimental because the weighting vectors $W_i$ still represent quite a good approximation of the control vectors $S_i$. In contrast to step S6, in step S13 a reference control vector $S_i$ is not replaced by the new control vector $S_i'$, but instead by $S_i + D_i$. This ensures that the reference control vector $S_i$, that remains stored at the subscriber station MSk for a repetition of the method, furthermore agrees with the corresponding weighting vector $W_i$ of the base station BS. In the event that the correction of the weighting vector $W_i$ in step S12 was greater than the actual measured change, this overcorrection is automatically cancelled by a repetition of steps S1 to S3, S10 to S12 in a succeeding period of the method, with the result that if a component of a control vector $S_i$ does not change in the course of further repetitions of these steps, the corresponding value of the weighting vector $W_i$ oscillates about the value of the control vector $S_i$.

If the change of the reference control vector $S_i$ in step S13 was not sufficiently great to take account of a determined change of the new control vector $S_i'$, a second correction of the corresponding value in the same direction takes place in the succeeding period of the method.

Figure 6:
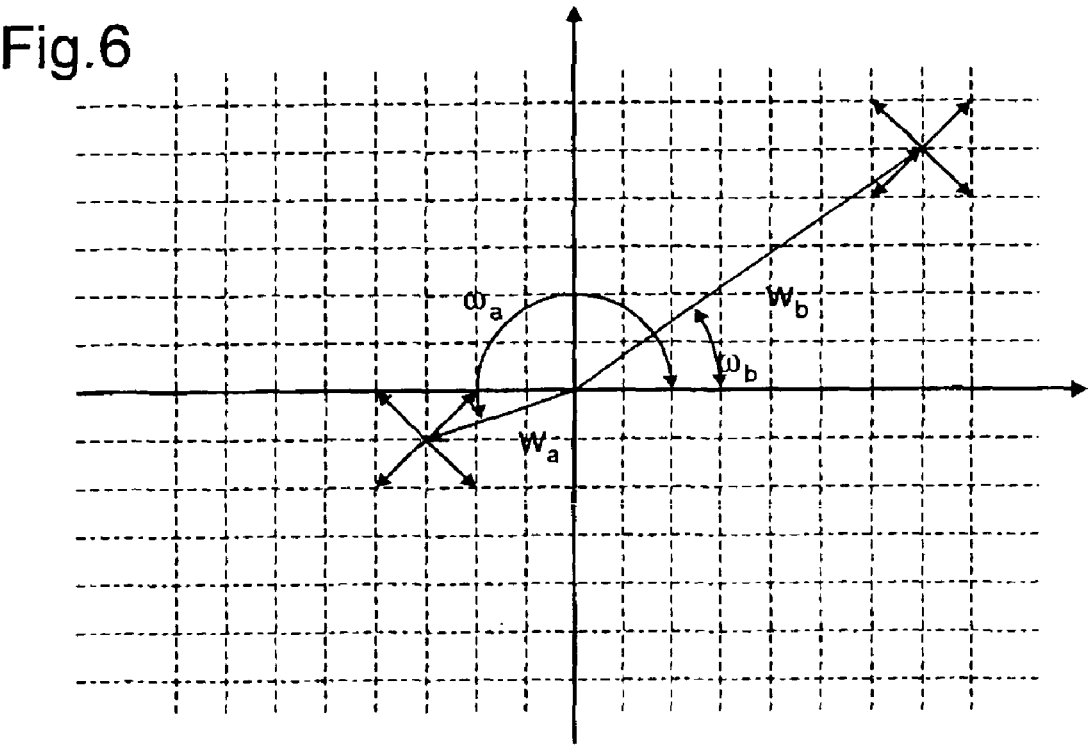
FIG. 6 shows possible changes in direction of weighting vectors with the method according to FIG. 5, if complex-significant components are used in Cartesian notation.

FIG. 6 shows, in the complex numerical level, two values $w_a$, $w_b$ of a component of a weighting vector and the values that these components can assume in each case after performance of step S12 in FIG. 5. It can be seen that in the case of component $w_a$, that has a smaller amount than $w_b$, the change in the phase angle $\omega_a$ due to the change of step S12 can be substantially greater than the phase angle $\omega_b$. To avoid this effect, a polar representation can be used in place of the Cartesian representation of complex components assumed above. In a case of this kind, the discretized differential vector $D_i$ can be defined as follows.

$$(\Delta_i)_j = \begin{cases} (+1, +1) & \text{if } |(S_i')_j| > |(S_i)_j| \text{ and } \operatorname{phase}((S_i')_j) > \operatorname{phase}((S_i')_j) \\ (+1, -1) & \text{if } |(S_i')_j| > |(S_i)_j| \text{ and } \operatorname{phase}((S_i')_j) < \operatorname{phase}((S_i')_j) \\ (-1, +1) & \text{if } |(S_i')_j| < |(S_i)_j| \text{ and } \operatorname{phase}((S_i')_j) > \operatorname{phase}((S_i')_j) \\ (-1, -1) & \text{if } |(S_i')_j| < |(S_i)_j| \text{ and } \operatorname{phase}((S_i')_j) < \operatorname{phase}((S_i')_j) \end{cases}$$

Figure 7:
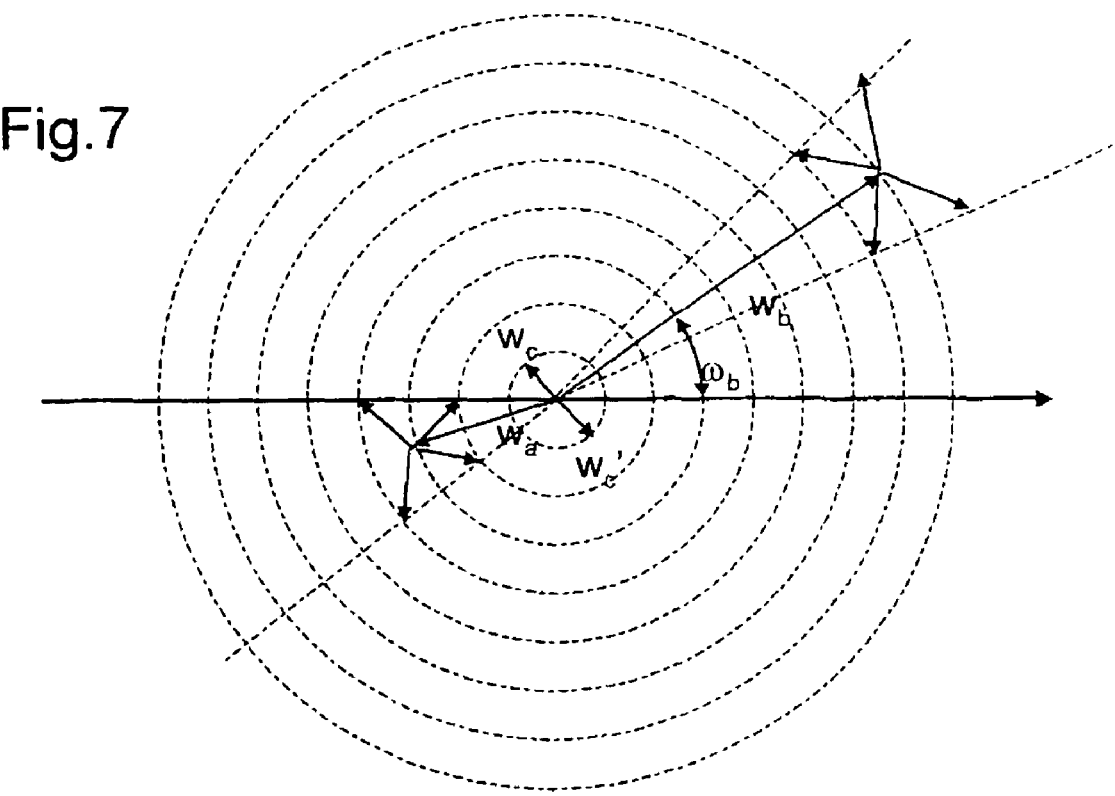
FIG. 7 shows possible changes in direction with the method according to FIG. 5 where a polar notation of complex-significant components is used.

As such, if the first bit of the bit pair $(D_i)_j$ has the value 1 or −1, the amount of the corresponding weighting vector must be increased or reduced by one unit, and if the second bit has the value 1 or −1 the phase angle must be increased or reduced by one step width, that can be arbitrarily set. FIG. 7 shows the values in the complex numerical levels that the component $w_a$, or $w_b$, can assume with this variant before and after performance of the matching step S12. With this variant, the number of steps required to bring about a given phase rotation of the component is independent of the amount of the component itself and depends only on the width of the step.

With this variant, it is also possible to permit negative amounts of components. This, for example, avoids the possibility of reversing the phase of a component $w_c$ of amount 1 by 180° independent of the predetermined step width of the phase angle in the course of two periods of the method, by setting the amount to 0 during a first implementation of the updating step S12 and setting the amount to −1 during a second implementation in the course of a succeeding period, and thus obtaining the component designated as $w_c'$ in the illustration.

A phase rotation through 180° also can be completed in only one step if the discretizing is chosen so that the amplitude value 0 is not contained if, for example, a step of +0.5 leads to −0.5.

Figure 8:
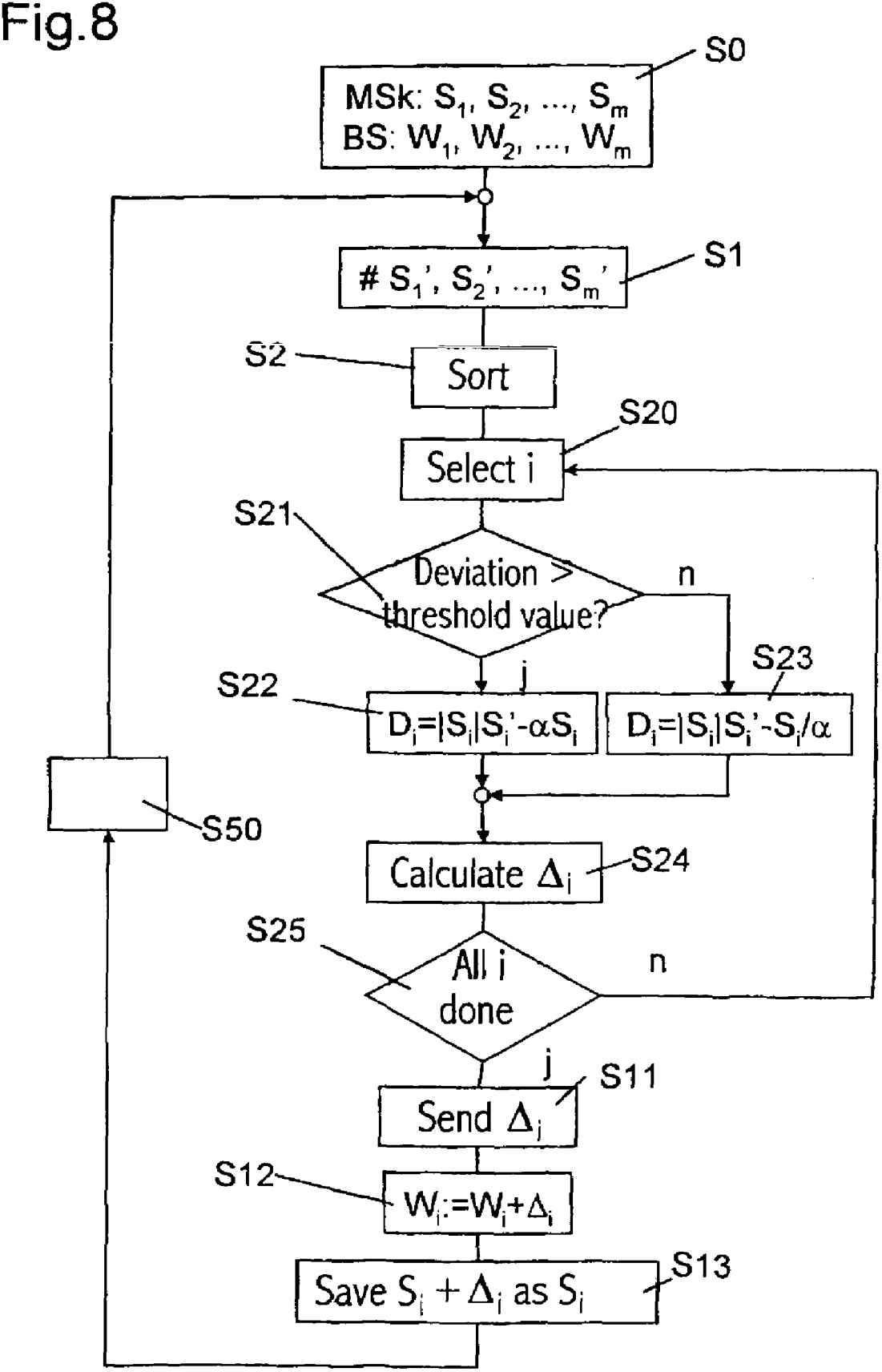
FIGS. 8, 9 show modifications of the method from FIG. 5.

FIG. 8 shows a preferred development of the method from FIG. 5. Steps S0 to S2 in this case are again the same as in FIGS. 4 and 5. It is assumed in this case that the new control vectors $S_1', S_2', \ldots, S_m'$ are each obtained with a unit amount during the intrinsic vector analysis, whereas the amounts of the reference control vectors $S_i, \ldots, S_m$ can deviate from 1. After the new control vectors have been assigned to the reference control vectors $S_1, \ldots, S_m$, an index I is arbitrarily chosen in step S20, in order to then check in step S21 whether the direction deviation between the new control vector $S_i'$ and reference control vector $S_i$ exceeds a limit value. An overshoot of this kind can, for example, be detected if the scalar product of the two vectors is less than the amount of the old control vector by a predetermined amount; e.g., 1%.

If the overshoot is detected, that is if the change in direction of the control vectors is strong, the method branches to step S22, in which a differential vector $D_i$ is calculated in accordance with the following formula.

$$D_i = |S_i|S_i' - \alpha S_i$$

with $\alpha$ being a real constant and greater than 1. The first term on the right side of this formula is a vector parallel to the new control vector $S_i'$ with the amount of the reference control vector $S_i$. The second term is a vector parallel to the reference control vector $S_i$ with an amount reduced by the factor $\alpha$. The difference $D_i$ is therefore a vector that is essentially antiparallel to $S_i$ and $S_i'$.

If the limit value is not overshot, or the change in direction is slow, the differential vector $D_i$ is calculated according to the following formula $$D_i = |S_i|S_i' - \frac{1}{\alpha}S_i,$$

with $\alpha$ having the same value as above. The differential vector $D_i$ in this case is essentially parallel to $S_i$ and $S_i'$.

The differential vector $D_i$ obtained in this way is then, in step S24, reshaped to the discretising differential vector $\Delta_i$ in the same way as is known from step S10 of FIG. 5. The precise direction of the discretized differential vector $\Delta_i$ is, of course, different to that of the differential vector $D_i$, but the rough orientation parallel or antiparallel to $S_i$ and $S_i'$ is, however, retained.

In step S25, a check is carried out to determine whether indices i remain that are still unprocessed and, if so, the process returns to step S20, selects a new index and processes this in the manner described above.

After all the differential vectors $\Delta_i$ obtained in this way have been received, they are, as already described with reference to FIG. 5, sent in step S11 to the base station BS and there added to the weighting vectors $W_i$ in step S12. Furthermore, the sum $S_i + \Delta_i$ is stored in step S13 in order to be used by the subscriber station MSk in a succeeding period of the method as a reference control vector $S_i$.

If during this method the direction of a control vector changes only slowly, the amount of the reference control vector and of the corresponding weighting vector, whose development mirrors the reference control vector, increases from period to period due to the parallel orientation of the added discretized differential vectors, thus enabling an increasingly more sensitive control of the direction of the weighting vector at the base station BS. The amount of a control vector with a rapidly changing direction on the other hand reduces over time, with the result that the direction of this control vector, or of its corresponding weighting vector at the base station, can be changed considerably in just a few periods. In this way, an automatic matching of the sensitivity of the directional control to the changeability of the direction of the control vectors is obtained without any additional signaling expense.

Figure 9:
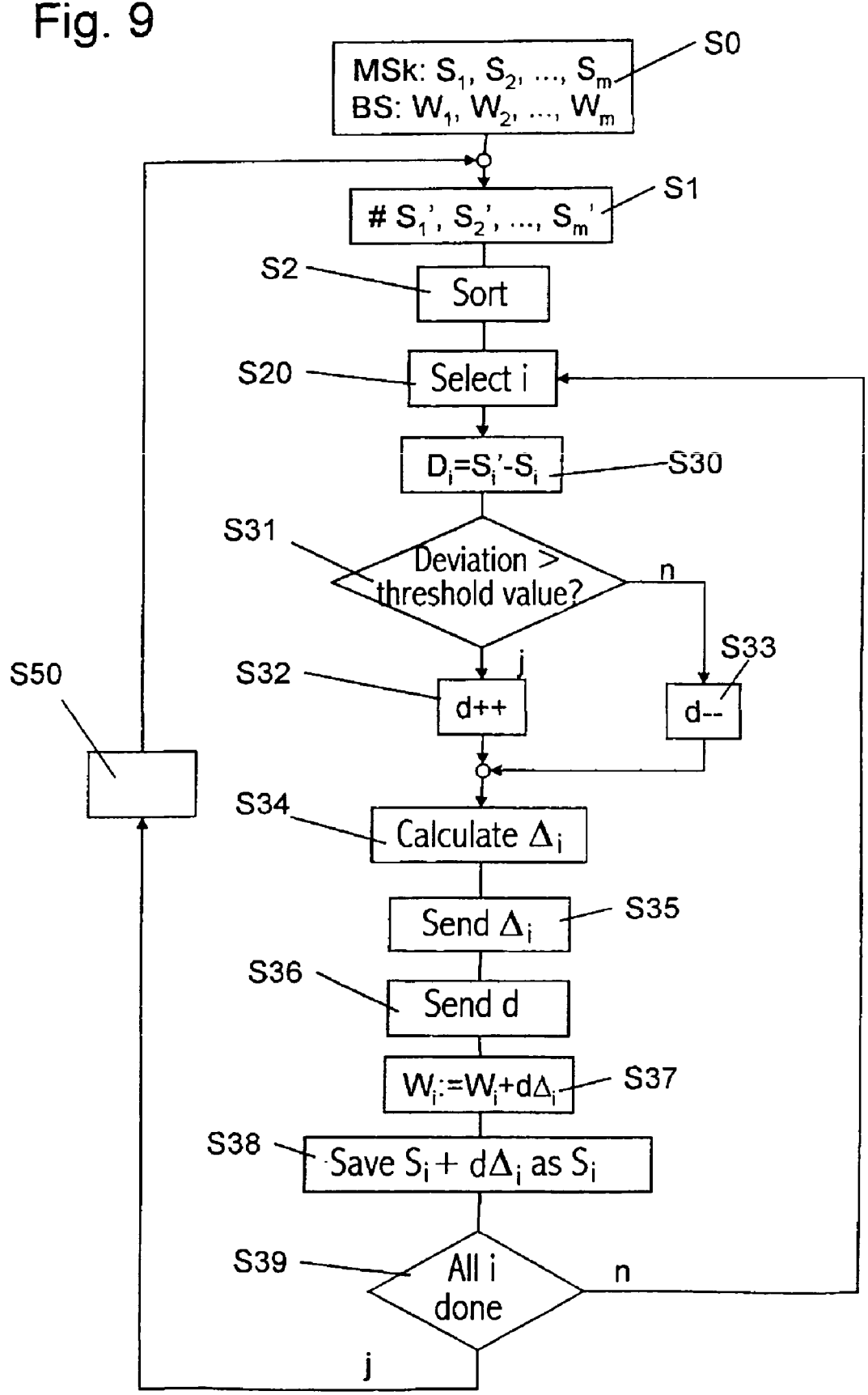

The same advantage can be achieved in other ways via the method shown in FIG. 9. Steps S0, S1, S2, S20 of this method are the same as already described with reference to FIG. 8. In contrast to the embodiment in FIG. 8, it is, however, accepted here that the reference control vectors $S_i$ are scaled to 1 exactly the same as the new control vectors $S_i'$. The differential vector $D_i = S_i' - S_i$ calculated in step 30 following step S20 is therefore a direct measure of the change of direction of the ith control vector.

A check is carried out in step S31 to determine whether the change in direction exceeds a limit value. If so (i.e., if the change in direction of the control vector is fast), a step width d is increased in step S32; otherwise, the method branches to step S33 where the step width d is reduced.

The increase in the step width d in step S32 can, for example, be achieved by multiplying the step width d with a predetermined factor $\alpha$ that is greater than 1, or by using a fixed predetermined initial value, whereas the reduction in the step width in step S33 can be achieved by dividing the step width d by a fixed value that is greater than 1. Because the multiplication, or division, with d can take place repeatedly in successive periods of the method, the step width is variable within wide limits.

The determination of the discretized differential vector $\Delta_i$ in step S34, following the determination of the step width d, is the same as in step S24 of FIG. 8. The discretized differential vector $\Delta_i$ and the step width d are transmitted in steps S35 and S36 to the base station BS and the weighting vector $W_i$ corresponding to the control vector $S_i$ is updated using the formula $W_i := W_i + d\Delta_i$. With this variant of the method, the change of the weighting vector $W_i$ resulting from a given discretized differential vector $\Delta_i$ is greater the more pronounced the change in the direction of the corresponding control vector $S_i$, whereas it always reduces further the longer the direction of the control vector changes only slightly. An updating of the weighting vectors well matched to different change behavior also can be achieved in this way.

The transmission of the step width in this case also can take place for all components of a control vector, or in the case where several control vectors are to be transmitted (e.g., the selected intrinsic vectors), jointly for several control vectors. It is to be expected that the speed of change of all intrinsic vectors is the same or at least similar because they are essentially dependent on the speed with which the propagation conditions can change. In this way, the transmission of the step width takes up hardly any bandwidth.

In step S38, the old weighting vector $S_i$ is replaced by $S_i + d\Delta_i$. The old control vector $S_i$ thus changes in step with the weighting vector $W_i$.

If in the succeeding step S39 it is detected that not all indices i are being processed, the method repeats the steps from step S20 for a further index i. Otherwise, the updating is completed and, after a predetermined time span, the subscriber station MSk begins the process again from step S1 as new.

With the method described above with reference to FIGS. 4, 5, 8, 9, problems can arise in that, due to an error in the transmission of the differential vectors $D_i$ or $\Delta_i$ to the base station BS, a deviation creeps in between the values of the weighting vectors $W_i$ and those of the reference control vectors $S_i$, that with proper functioning of the transmission should be identical with the weighting vectors. There are several possibilities of rectifying this problem.

Figure 10:
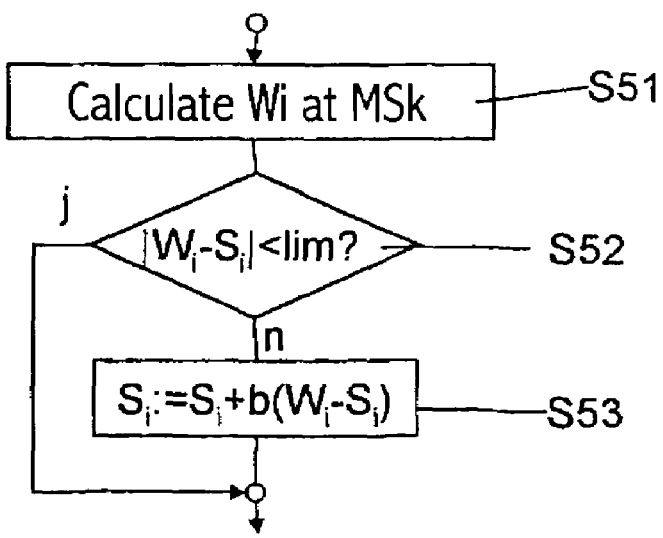
FIG. 10 shows method steps for correcting transmission errors during the updating of weighting vectors.

One of the first is that shown in the flow diagram in FIG. 10, whose steps at the point marked S50 can be inserted into the method of FIGS. 4, 5, 7 and 9. The first of these steps is the estimation by the subscriber station MSk (S51) of the weighting vectors $W_i$ used by the base station. An estimation of this kind is possible using so-called dedicated pilot bits, that are specifically transmitted from the base station BS for each antenna element $AE_1, \ldots, AE_M$ and are compared by the subscriber station MSk with one of the channel estimates obtained from the common pilot bits.

There is some uncertainty attached to the estimation by the subscriber station MSk. Therefore, a deviation between the weighting vectors estimated by the subscriber station MSk and the old control vectors $S_i$ should be considered to indicate the presence of a transmission error only if it exceeds a limit value lim. The subscriber station MSk therefore checks, in step S52, whether such a limit violation is present. If not, it is assumed that the weighting vector $W_i$ used by the base station BS is correct and nothing further takes place. If on the other hand it is found that a deviation is present, the reference weighting vector $S_i$ is adapted in step S53 using the formula $S_i := S_i + b(W_i - S_i)$. In this case b is a constant, the value of which is greater than 0 and $\leq 1$. A value of b=1 corresponds to the complete replacement of the old control vector $S_i$ by the estimated weighting vector $W_i$. A procedure of this kind is sensible only if the estimation can be sufficiently accurate. If the estimation is subject to uncertainties, then it is more useful to select a value of b which is between 0 and 1, so that the reference control vector $S_i$ after the correction of step S53 lies between its value before the correction and that of the estimated weighting vector $W_i$.

A further possibility of compensating for errors in the transmission of the differential vector over a period of time with the methods according to FIGS. 4, 5, 8 and 9 is to multiply the reference control vector $S_i$, in the same way as also the weighting vector $W_i$ in step S50, with a forget factor that is chosen to be close to 1 but less than 1. A multiplication of this kind does not change the direction of both vectors but it does lead to a discrepancy between the control vectors and the weighting vectors that has resulted due to a transmission error, that with each repetition of step S50 is reduced by the forget factor so that the base station and subscriber station over time return to a harmonization of the vectors without a controlling external influence, merely by the ongoing updating of the weighting factor by the transmission and addition of the differential vector.

The shortening of control vectors in step S50 partially cancels the effect of an extension by the adding of an outwards-directed discretized differential vector $D_i$ in step S13. Therefore, with this variant of the method, the amount of $S_i$ cannot be any arbitrary size and the control of the direction of $S_i$ cannot be any arbitrary sensitivity, if the forget factor is a fixed constant. To avoid such a restriction, it can be useful to use a forget factor that is a function of the amount of the control vectors instead of a constant forget factor. The forget factor can, for example, be defined for all control vectors uniformly as a function of the amount of the longest control vector or as a function of the sum of the amounts of the control vectors, with the function converging from below with respect to 1 with increasing argument. It is also conceivable to define a separate forget factor for each of the control vectors relative to its amount $S_i$ in each case.

Figure 11:
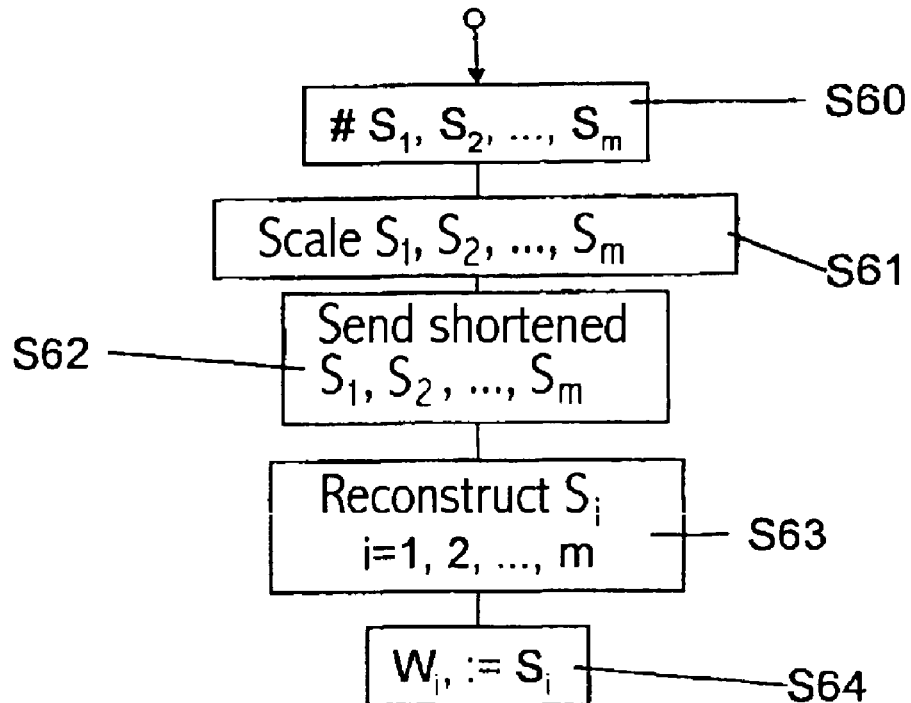
FIG. 11 shows a flow diagram of a second embodiment of the method of the present invention that can be used, amongst other things, to initialize the first embodiment.

A second embodiment of the method in accordance with the present invention is shown in FIG. 11. With this embodiment, no differential vectors representative of the change of the control vectors are transmitted from the subscriber station to the base station, so that a single transmission error cannot lead to longer persisting deviations between control vectors and weighting vectors. With this method, the subscriber station MSk first determines a set of control vectors $S_i, S_2, S_m$ from a long-term covariance matrix $\overline{R_{XX}}$, in the manner described above. The intrinsic vectors of undetermined amount obtained in this way are scaled in step S61. A possible scaling method is the scaling of each control vector to the amount 1. In this way, when control vectors of 2M numerical values, necessary to completely transmit the M complex-significant components of such a vector whose number corresponds to the number M of the antenna elements of the base station, are being transmitted to the base station BS in step S62, one can be omitted in each case. This numerical value can be reconstructed in step S63 at the base station by using the scaling rule. The reconstructed vectors are stored in step S64 for use as weighting vectors $W_i$ in the base station Bs.

The saving of the transmission of a numerical value can be achieved using any scaling rule. A particularly advantageous possibility is to perform the scaling of the control vectors $S_i$ in each case in such a way that a fixed predetermined component, such as the real part of the first component, assumes the value 1. This value then need not be transmitted and it simply can be added again at the base station without any calculation steps being necessary to do so.

Of course, a Cartesian representation with real and imaginary parts also can be replaced by a polar representation of the vector components with amount and phase. In this case, the amount of a component can be omitted during the transmission of a control vector to the base station BS.

The transmission of a second numerical value can be made superfluous by a development of this second embodiment in that the phases of all components of a control vector are scaled. As a scaling rule, it can, for example, be assumed that the first component of each control vector should be positive and real. For this purpose, all components of a control vector are rotated about the sign-reversed phase of its first component. In this case, the imaginary part also or, where a polar representation is used, the phase of the first component, need not be transmitted to the base station because there it can be assumed to be 0.

This method makes possible a continuous updating of the weighting vectors used by the base station BS to send to the subscriber station MSk. In particular, this method is suitable for supplying the base station BS the set of weighting vectors $W_i, \ldots, W_m$ assumed to be known in step S0 of the method of FIGS. 4, 5, 8 and 9.

If the method according to FIG. 11 is used for continuous updating of the weighting vectors of the base station, an error in the transmission of a high-significance bit can lead to a component of a weighting vector being grossly incorrect, which can cause poorly matched beam shaping for the subscriber station MSk. To avoid such errors, a development of the variant of the inventive method provides that the base station BS performs a plausibility check of the received control vectors and uses a control vector as a weighting vector only if the plausibility check provides a satisfactory result. Such a plausibility check can, for example, be carried out in that in successive periods of the method (with control vectors being transmitted to the base station once in each period) the control vectors are recorded and a new control vector is regarded as implausible if its deviation from its predecessor is greater than the difference between this predecessor and the latter's predecessor by more than a predetermined factor. In such a case, it can, for example, be provided that the predecessor of the newly transmitted vector is continued in use unchanged as a weighting vector, or that the weighting vector is calculated by averaging, weighted if necessary, from the new control vector and its predecessor.

A further possibility of dealing with transmission errors is, of course, the redundant or coded transmission of control vectors. Such a procedure naturally requires the transmission of a greater amount of data from the subscriber station MSk to the base station BS than in the case of a simple plausibility check as described above. There are, however, advantageous variants that can achieve effective protection against gross errors in the updating of weighting vectors with a minimum extra expense with regard to transmission bandwidth. With this variant, the most significant bit is transmitted twice for each numerical value of a control vector to be transmitted.

If both versions of the bit are received identically by the base station, it can be assumed that these are correct and any errors in the transmission of less significant bits cannot lead to very serious errors in the beam shaping by the weighting vectors.

If the two most significant bits received by the base station are unequal, then, of course, one of these bits must be faulty. Which is the correct value cannot be determined via the transmission. This decision can, of course, be reached using a plausibility check in that, for instance, the value of the most significant bit that differs least from the corresponding numerical value received in the preceding period is assumed to be correct, or in that a change trend of the relevant numerical value is determined from recordings of a number of control vectors reaching back over earlier periods and the value of the most significant bit showing the least deviation from an extrapolation of the observed change trend is chosen.

Figure 12:
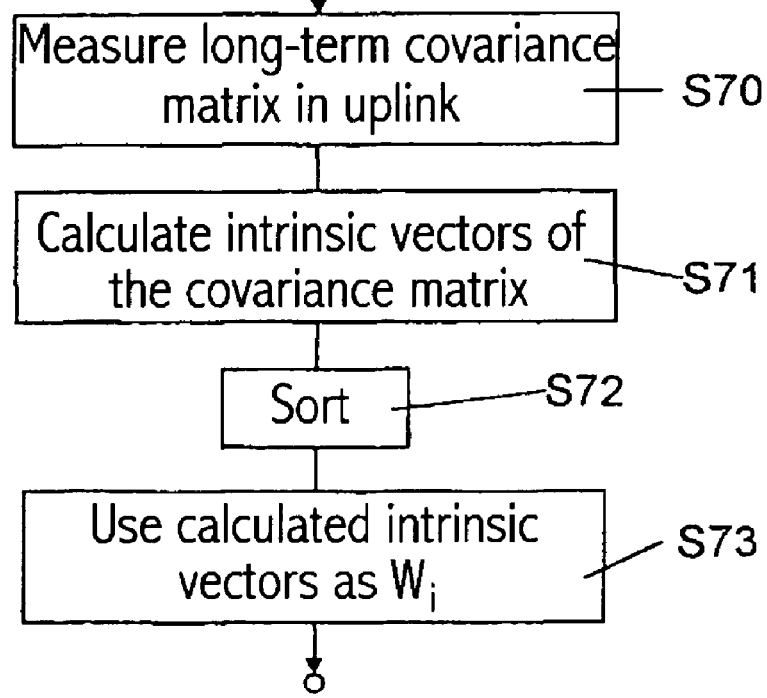
FIG. 12 shows an alternative procedure for initializing the method according to the first embodiment.

FIG. 12 shows an alternative possibility of initializing the weighting vectors $W_1, W_2, \ldots, W_m$ of the base station BS. In contrast to the method dealt with previously, in this case no control vectors are transmitted from the subscriber station MSk to the base station BS to be used there as weighting vectors, but instead the base station BS itself, in step S70, carries out a measurement of the long-term covariance matrix $\overline{R_{xx}}$ of the uplink signal received from the subscriber station MSk. In step S71 it performs, in the manner described above for the subscriber station MSk, an intrinsic vector analysis of this covariance matrix. In step S72 these intrinsic vectors are sorted according to a predetermined scheme e.g., using the amounts of their intrinsic values. The subscriber station MSk carries out a similar sorting for the vectors determined by it. Because the transmission channels in the uplink and downlink direction in the long term are admittedly not completely, but still extensively, reciprocal, it can be assumed that in this way sets of weighting vectors or control vectors are received at the base station and subscriber station in each case in a sequence which largely coincides with at least an approximate agreement of the components.

After this initialization, any existing deviations between the control vectors $S_1, \ldots, S_m$ of the subscriber station MSk and the weighting vectors $W_i, \ldots, W_m$ of the base station BS balance out over time, exactly the same as deviations due to transmission errors, if a transmission error compensating method of the type described above is used, that in step S50 performs the method steps of FIG. 10 or the multiplication using the forget factor.

Because of this automatic error correction, fixed initial control vectors also can be used instead of explicit initialization. It is appropriate to choose their amounts to be very small so that large phase changes can be achieved with few steps.

A further possibility, not illustrated, of initializing the weighting vectors $W_1, W_2, \ldots, W_m$ of the base station is to transmit only a limited number of the high-significance bits in each case from a set of control vectors $S_1, S_2, \ldots, S_m$ measured by the subscriber station MSK. Thus, for instance, it can be provided that even if the subscriber station is able to calculate the control vectors with an accuracy of 8 bits, only one or two of the most significant bits of each numerical value of such a control vector are transmitted to the base station, so that this begins transmission with weighting vectors that have only a rough approximation to the control vectors. In this case also, the error compensation of step S50 over a period of time can achieve a more precise matching of a weighting vector to the respective corresponding control vector, provided the latter changes slowly enough.

This method can be used not only during the initialization but also during the complete period. If necessary, the weighting vectors nevertheless can be transmitted in rough quantisizing, not to transmit their exact values but instead to make sure that the base station and mobile station sort control and weighting vectors in the same sequence, so that one of the changes of an nth control vector reported by the subscriber station to the base station can be applied to the correct weighting vector. It is, of course, possible to sort the intrinsic vectors at the subscriber station and base station in largely the same order using the intrinsic values, but discrepancies can occur if two intrinsic vectors have the same intrinsic values. To distinguish between such intrinsic vectors, a coarse transmission is sufficient, which in extreme cases contains only the signs of the components.

Although the present invention has been described with reference to specific embodiments, those of skill in the art will recognize that changes may be made thereto without departing from the spirit and scope of the present invention as set forth in the hereafter appended claims.

The invention claimed is:

1. A method for transmitting feedback information for beam shaping in a radio communication system having a plurality of subscriber stations and a base station, with the base station having an antenna device with a plurality of antenna elements, the method comprising the steps of:
   emitting a downlink signal, via the antenna device, weighted in each case with coefficients of an actual weighting vector to one of the plurality subscriber stations;
   estimating a direction of a control vector in an M-dimensional vector space by the subscriber station by measurements of the downlink signal;
   determining a change of the direction estimated using a direction of a reference control vector;
   transmitting information representative of the change to the base station as feedback information; and
   matching the weighting vector using the representative information.

2. A method for transmitting feedback information for beam shaping in a radio communication system as claimed in claim 1, wherein the control vector and weighting vector are parallel vectors.

3. A method for transmitting feedback information for beam shaping in a radio communication system as claimed in claim 2, wherein the information representative of the change is a vectorial difference between a new control vector that has the estimated direction and the reference control vector.

4. A method for transmitting feedback information for beam shaping in a radio communication system as claimed in claim 3, wherein components of a vectorial difference of the change are limited to two values respectively corresponding to a positive or negative difference between corresponding components of the reference control vector and the new control vector.

5. A method for transmitting feedback information for beam shaping in a radio communication system as claimed in claim 4, wherein an extent of the matching of the weighting vector is set greater the faster the direction of the control vector changes.

6. A method for transmitting feedback information for beam shaping in a radio communication system as claimed in claim 5, the method further comprising the steps of:
   calculating a step width;
   multiplying the vectorial difference by the step width; and
   adding a result of the vectorial difference multiplied by the step width to achieve the matching of the weighting vector.

7. A method for transmitting feedback information for beam shaping in a radio communication system as claimed in claim 6, wherein all steps of the method are periodically repeated.

8. A method for transmitting feedback information for beam shaping in a radio communication system as claimed in claim 7, wherein the control vector is taken as the reference control vector for a succeeding period of the method.

9. A method for transmitting feedback information for beam shaping in a radio communication system as claimed in claim 7, wherein the reference control vector is an image of the weighting vector reflected at the subscriber station, and the reference control vector is matched using the representative information in a same way the weighting vector is adapted.

10. A method for transmitting feedback information for beam shaping in a radio communication system as claimed in claim 9, wherein the subscriber station performs an estimation of the weighting vector used by the base station and, if there is a deviation between the weighting vector and the reference control vector, adapts the reference control vector.

11. A method for transmitting feedback information for beam shaping in a radio communication system as claimed in claim 7, the method further comprising the step of periodically multiplying both the control vector and the weighting vector by a forget factor, with the forget factor being a real number between 0 and 1.

12. A method for transmitting feedback information for beam shaping in a radio communication system as claimed in claim 11, wherein the forget factor is a constant.

13. A method for transmitting feedback information for beam shaping in a radio communication system as claimed in claim 11, wherein the forget factor is a function of an amount of at least one control vector.

14. A method for transmitting feedback information for beam shaping in a radio communication system as claimed in claim 1, the method further comprising the step of assigning an amount to the control vector that is set smaller the faster the direction of the control vector changes.

15. A method for transmitting feedback information for beam shaping in a radio communication system as claimed in claim 1, wherein components of the control vectors and weighting vectors are complex-significant.

16. A method for transmitting feedback information for beam shaping in a radio communication system as claimed in claim 15, wherein the components of the control vectors and weighting vectors consist of an amount and phase.

17. A method for transmitting feedback information for beam shaping in a radio communication system as claimed in claim 1, wherein components of the control vectors estimated by the subscriber station are transmitted to the base station for use as weighting vectors.

18. A method for transmitting feedback information for beam shaping in a radio communication system as claimed in claim 17, wherein, during initialization, the components of the control vectors are transmitted with a lesser accuracy than estimated by the subscriber station.

19. A method for transmitting feedback information for beam shaping in a radio communication system as claimed in claim 1, wherein, for initialization, control vectors are estimated separately both from each other at the subscriber station and from weighting vectors at the base station.

20. A method for transmitting feedback information for beam shaping in a radio communication system as claimed in claim 1, wherein fixed, predetermined control vectors are used for initialization.

21. A method for transmitting feedback information for beam shaping in a radio communication system having a plurality of subscriber stations and a base station, with the base station having an antenna device with a plurality of antenna elements, the method comprising the steps of:
   emitting a downlink signal weighted in each case with coefficients of an actual weighting vector to one of the plurality of subscriber stations;
   estimating a direction of a control vector by the subscriber station using measurements of the downlink signal;
   scaling the control vector using a scaling rule;
   transmitting components of the control vector, save for a predetermined component, to the base station; and
   restoring the control vector at the base station via the scaling rule.

22. A method for transmitting feedback information for beam shaping in a radio communication system as claimed in claim 21, wherein the scaling rule contains a scaling of the predetermined component to a fixed value.

23. A method for transmitting feedback information for beam shaping in a radio communication system as claimed in claim 21, wherein at least a most significant bit of each component is transmitted several times.

24. A subscriber station for use in a method for transmitting feedback information for beam shaping in a radio communication system having a plurality of subscriber stations and a base station, wherein the base station includes an antenna device, having a plurality of antenna elements, which emits a downlink signal weighted in each case with coefficients of an actual weighting vector to the subscriber station, the subscriber station comprising:
  a measuring and processing unit for estimating a direction of a control vector in an M-dimensional vector space using measurements of the downlink signal, and for comparing the estimated direction with a direction of a reference control vector; and
  parts for transmitting information representative of a change of the direction estimated to the base station.

25. A subscriber station for use in a method for transmitting feedback information for beam shaping in a radio communication system having a plurality of subscriber stations and a base station, wherein the base station includes an antenna device, having a plurality of antenna elements, which emits a downlink signal weighted in each case with coefficients of an actual weighting vector to the subscriber station, the subscriber station comprising:
  a measuring and processing unit for estimating a direction of a control vector in an M-dimensional vector space using measurements of the downlink signal, and for scaling the control vector using a scaling rule; and
  parts for transmitting the components of the control vector, save for a predetermined component, to the base station.

* * * * *